R. W. Lewis.

Sealing Cans.

No. 3115 Reissued Sept. 8, 1868.

Witnesses:

Stephen G. Cory

E. P. Waller

Inventor:

R. W. Lewis

UNITED STATES PATENT OFFICE.

S. B. ROWLEY, OF PHILADELPHIA, PENNSYLVANIA, ASSIGNEE OF R. W. LEWIS.

IMPROVEMENT IN SEALING PRESERVE-CANS.

Specification forming part of Letters Patent No. 14,245, dated February 12, 1856; Reissue No. 3,115, dated September 8, 1868.

*To all whom it may concern:*

Be it known that I, S. B. ROWLEY, of Philadelphia, Pennsylvania, am the owner of Letters Patent for an Improvement in Sealing Preserve-Cans, granted to R. W. LEWIS, February 12, 1856; and I do hereby declare the following to be a full, clear, and exact description of the said invention, which consists of a mode, described hereinafter, of closing up the can, by which the tearing or wrinkling of the rubber or other packing is effectually prevented; and also of a mode, described hereinafter, of preventing the contents of the vessel from gaining access to the packing.

In order to enable others skilled in the art to practice the said invention, I will now proceed to describe a mode of carrying the same into effect, reference being had to the accompanying drawings, which form a part of this specification, and in which—

Figure 1:
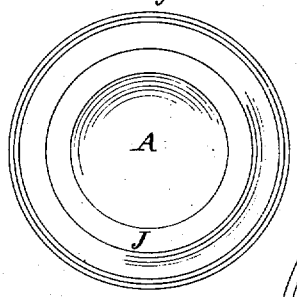
Figure 2:
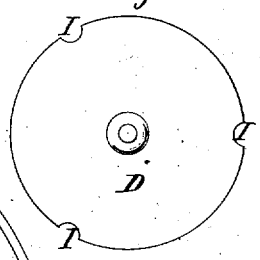
Figure 3:
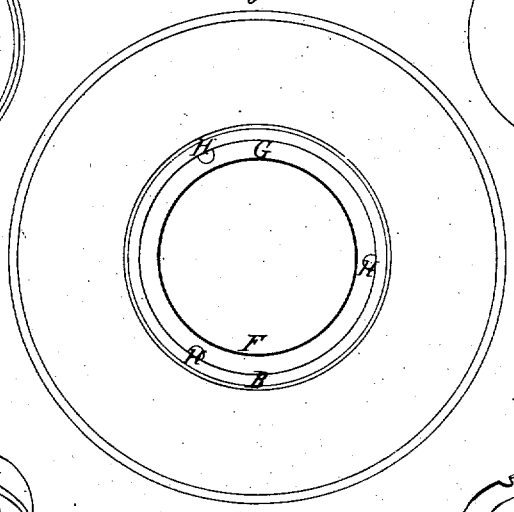
Figure 4:
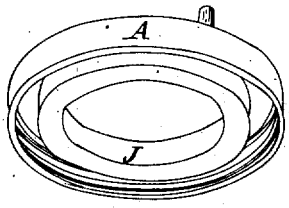
Figure 5:
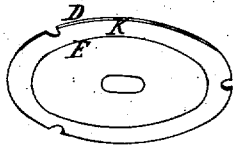
Figure 6:
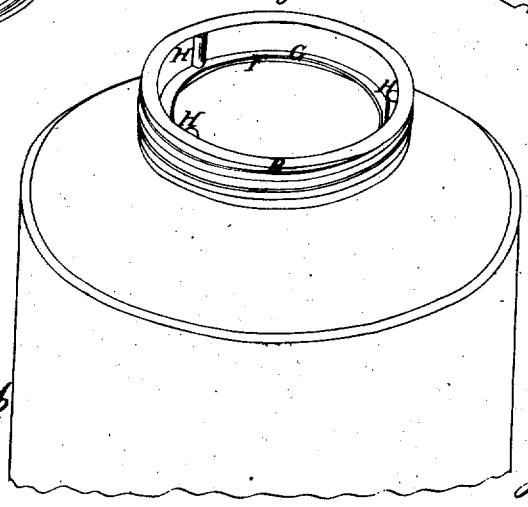

Figures 1, 2, and 3 are face views, and Figs. 4, 5, and 6 perspective views, illustrating a mode of carrying out the invention of the said R. W. LEWIS.

A is a cap or cover having an internal screw-thread adapted to an external thread on the neck B of the can or jar. The interior of the neck is somewhat larger in diameter than the throat *f*, so that an internal annular projection or shoulder is formed at a distance below the edge of the mouth, and a raised circular edge or seat, G, is formed on this shoulder; and between this seat and an annular projection, J, within the screw-cap intervenes the rubber packing, when the cap is screwed down to its place on the neck B. The rubber packing *k* rests on this raised edge or seat G; but above the packing is a plate, D, on which the projection J on the cap A bears, so that on screwing down the latter the rubber is effectually prevented from being turned round or twisted or wrinkled by the turning cap.

In order to prevent the access of the contents of the can or jar to the rubber, there is placed beneath the latter a smaller plate, E, which fits the throat *f*, and this latter plate may be connected by a central rivet, or otherwise, to the larger plate D, the rubber intervening between them. As the smaller plate fits snugly in the throat it effectually prevents the access of the contents of the jar to the rubber which rests on the raised edge G, while the upper plate, as before remarked, prevents the rubber from being subjected to torsion on the screwing down of the cap.

If desired, the raised edge or seat G may be of sufficient width to permit the plate E to rest upon it, in which case the annular projection J of the cap should be of sufficient diameter to press upon the plate D and the packing *k* at a little distance beyond the space covered by the plate E, so that the pressure on the plate D will compress the rubber against the raised edge or seat, thereby effecting a perfectly tight joint.

In order to prevent the possibility of the plate D being turned by the action of the screw-cap, ribs H may be arranged within the neck of the jar, these ribs being adapted to notches I I in the plate D, and, if desired, the space within the neck, between the cap and packing, may be filled with melted wax, poured in through an opening in the top of the cap.

It will be seen that the main object of this improvement in sealing preserve-cans is to prevent the rubber or other material used for packing from turning round, tearing, or wrinkling; and it will be evident that this object may be attained in cans or jars differing in form and construction from that described, the only indispensable requisite being the interposition of a plate between the rubber or other packing, and the cap or its equivalent having a screw-like action on the can or jar, so as to force the packing to its seat by direct pressure.

This improvement, therefore, of the said R. W. LEWIS, in sealing preserve-cans, is not restricted to the specific construction and arrangement of parts herein described; but

I claim as his invention, and desire to secure by Letters Patent—

1. A preserve can or jar having a plate intervening between the gum packing and a cover or its equivalent for compressing the packing to its seat on the jar.

2. The plate or its equivalent situated below the packing and filling the throat of the jar, as set forth, for the purpose specified.

3. Ribs H or recesses on the jar, in combination with notches or projections on the plate above the packing, for the purpose specified.

In testimony whereof I have signed my name to this specification before two subcribing witnesses.

S. B. ROWLEY.

Witnesses:
JOHN WHITE,
H. HOWSON.